United States Patent
Fergus et al.

(10) Patent No.: US 10,360,498 B2
(45) Date of Patent: Jul. 23, 2019

(54) UNSUPERVISED TRAINING SETS FOR CONTENT CLASSIFICATION

(71) Applicant: Facebook, Inc., Menlo Park, CA (US)

(72) Inventors: Robert D. Fergus, New York, NY (US); Lubomir Bourdev, Mountain View, CA (US); Balamanohar Paluri, Menlo Park, CA (US); Sainbayar Sukhbaatar, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 184 days.

(21) Appl. No.: 14/575,547

(22) Filed: Dec. 18, 2014

(65) Prior Publication Data
US 2016/0180243 A1  Jun. 23, 2016

(51) Int. Cl.
G06N 3/08    (2006.01)
G06N 20/00   (2019.01)

(52) U.S. Cl.
CPC .............. *G06N 3/08* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,572,628 A * | 11/1996 | Denker | ................ | G06K 9/52 706/20 |
| 7,016,529 B2 * | 3/2006 | Simard | ............ | G06K 9/00422 382/155 |
| 9,009,851 B2 * | 4/2015 | Droste | ................... | G06F 21/55 726/28 |
| 2005/0283450 A1 * | 12/2005 | Matsugu | ............ | G06K 9/00604 706/20 |
| 2006/0184471 A1 * | 8/2006 | Minamino | ............ | G10L 15/144 706/16 |
| 2007/0005529 A1 * | 1/2007 | Naphade | ........... | G06F 17/30038 706/16 |

(Continued)

OTHER PUBLICATIONS

Anna Bosch, Andrew Zisserman, and Xavier Muñoz. 2008. Scene Classification Using a Hybrid Generative/Discriminative Approach. IEEE Trans. Pattern Anal. Mach. Intell. 30, 4 (Apr. 2008), 712-727.*

(Continued)

*Primary Examiner* — Stanley K. Hill
(74) *Attorney, Agent, or Firm* — Sheppard Mullin Richter & Hampton LLP

(57) ABSTRACT

Various embodiments of the present disclosure include systems, methods, and non-transitory computer storage media configured to identify a set of training content items, each of the set of training content items comprising video content. A category may be assigned to each of the set of training content items. A plurality of variations may be provided to the each of the set of training content items. A first content recognition module may be trained in an unsupervised process to associate the plurality of variations of the each of the set of training content items with the category assigned to the each of the set of training content items. A classification layer may be generated based on the training the first content recognition module in the unsupervised process. A second content recognition module may be trained in a supervised process based on the classification layer.

20 Claims, 7 Drawing Sheets

(56) References Cited

U.S. PATENT DOCUMENTS

| | | | |
|---|---|---|---|
| 2014/0185925 A1* | 7/2014 | Datta | G06K 9/6256 |
| | | | 382/159 |
| 2016/0253801 A1* | 9/2016 | Linard | G06T 7/0016 |
| 2016/0314345 A1* | 10/2016 | Kanaujia | G06K 9/00288 |

OTHER PUBLICATIONS

Qi, Yuan, David Doermann, and Daniel DeMenthon. "Hybrid independent component analysis and support vector machine learning scheme for face detection." Acoustics, Speech, and Signal Processing, 2001. Proceedings.(ICASSP'01). 2001 IEEE International Conference on. vol. 3. IEEE, 2001.*

T. Wang, D. J. Wu, A. Coates and A. Y. Ng, "End-to-end text recognition with convolutional neural networks," Pattern Recognition (ICPR), 2012 21st International Conference on, Tsukuba, 2012, pp. 3304-3308.*

Karpathy, Andrej, et al. "Large-scale video classification with convolutional neural networks." Proceedings of the IEEE conference on Computer Vision and Pattern Recognition. Jun. 27-30, 2014.*

Hinton, Geoffrey E. et al.; "What kind of a graphical model is the brain?"; In Proc. 19th International Joint Conference on Artificial Intelligence 1765-1775 (2005).*

Hinton, G. E., Osindero, S. & Teh, Y.-W. A fast learning algorithm for deep belief nets. Neural Comp. 18, 1527-1554 (2006).*

Bengio, Y., Lamblin, P., Popovici, D. & Larochelle, H. Greedy layer-wise training of deep networks. In Proc. Advances in Neural Information Processing Systems 19 153-160 (2006).*

LeCun, Yann et al.; "Deep Learning"; 2015; Mcmillan Publishers; Nature vol. 521; pp. 436-444.*

Erhan, Dumitru; "Understanding deep architectures and the effect of unsupervised pre-training"; 2010; Universite de Montreal; 195 pages. (Year: 2010).*

Perozzi, Bryan et al.; DeepWalk: Online Learning of Social Representations; ACM; KDD'14 Aug. 24-27, 2014; pp. 701-710. (Year: 2014).*

Tang, Lei et al.; Leveraging social media networks for classification; Springer; Data Min Knowl Disc (2011) 23:447-478. (Year: 2011).*

* cited by examiner

UNSUPERVISED TRAINING SETS FOR CONTENT CLASSIFICATION

TECHNICAL FIELD

The technical field relates to the field of social networks. More particularly, the technical field relates to content classification techniques in social networks.

BACKGROUND

Social networks provide interactive and content-rich online communities that connect members with one another. Members of social networks may indicate how they are related to one another. For instance, members of a social network may indicate that they are friends, family members, business associates, or followers of one another, or members can designate some other relationship to one another. Social networks often allow members to message each other or post messages to the online community.

Social networks may also allow members to share content with one another. For example, members may create or use pages with interactive feeds that can be viewed across a multitude of platforms. The pages may contain images, video, and other content that a member wishes to share with certain members of the social network or to publish to the social network in general. Members may also share content with the social network in other ways. In the case of images and videos, members, for example, may publish the images and videos to a board or make the images and video available for searches by the online community. Optimal presentation or use of the content for members often depends on an ability to classify the content. However, it is often difficult to classify content shared in social networks, especially as the amount of content grows to very large proportions.

SUMMARY

Various embodiments of the present disclosure include systems, methods, and non-transitory computer storage media configured to identify a set of training content items, each of the set of training content items comprising video content. A category may be assigned to each of the set of training content items. A plurality of variations may be provided to the each of the set of training content items. A first content recognition module may be trained in an unsupervised process to associate the plurality of variations of the each of the set of training content items with the category assigned to the each of the set of training content items. A classification layer may be generated based on the training the first content recognition module in the unsupervised process. A second content recognition module may be trained in a supervised process based on the classification layer.

In various embodiments, the first content recognition module comprises a first convolutional neural network, and the second content recognition module comprises a second convolutional neural network. The plurality of variations may comprise a variation of an object in the video content.

In an embodiment, training the content recognition module in the supervised process comprises performing a backpropagation on the second content recognition module based on the classification layer.

In some embodiments, training the content recognition module in the supervised process comprises associating each of the set of training content items with a semantic sequence corresponding to the category assigned to the each of the set of training content items.

The plurality of variations may comprise at least one geometric variation of the each of the set of training content items. The plurality of variations may comprise at least one of a rotation, a translation, a rescaling, a color change, a geometric modification, or a filtering of the each of the set of training content items. In an embodiment, the plurality of variations comprises a variation of a perspective, lighting, or motion of an object.

In an embodiment, the second content recognition module is used to classify a set of evaluation content items. The set of evaluation content items may correspond to content items uploaded by users of a social networking system.

Other features and embodiments are apparent from the accompanying drawings and from the following detailed description.

Figure 1:
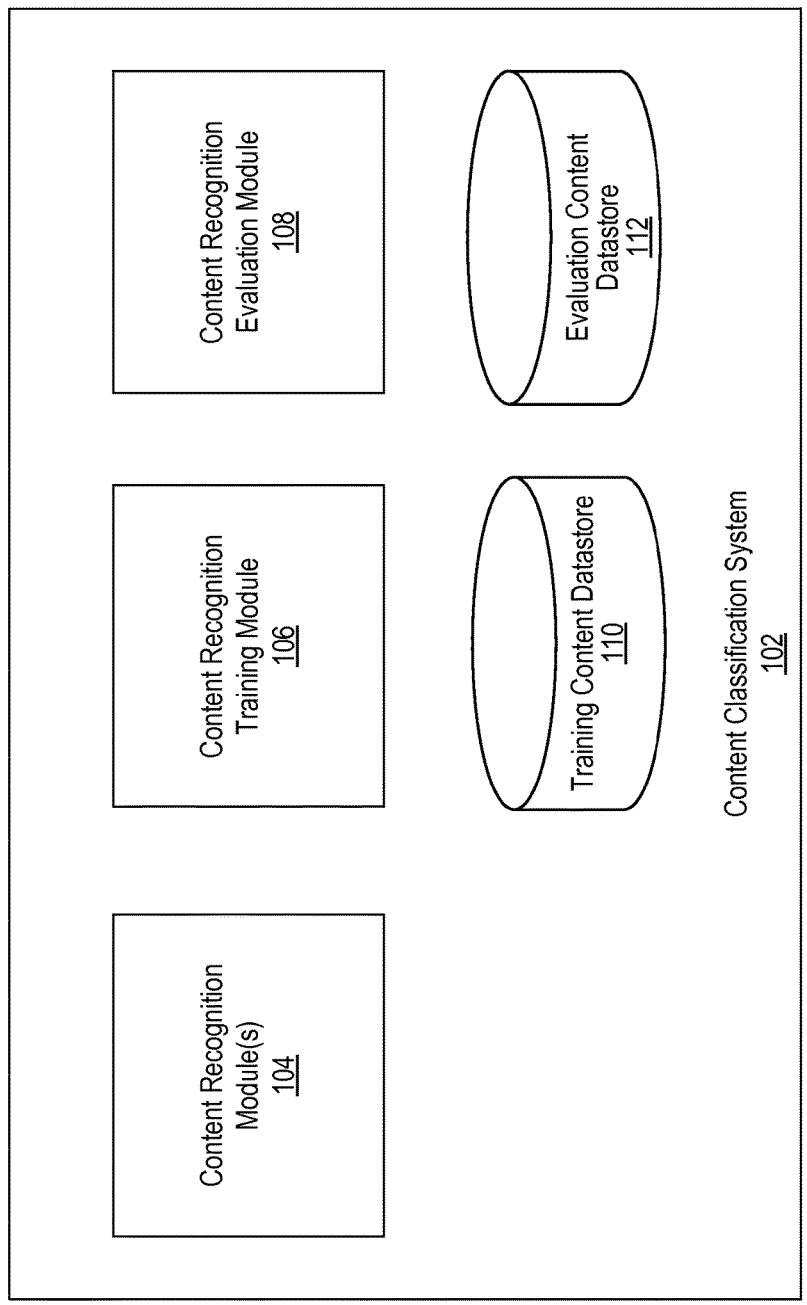
FIG. 1 shows an example diagram of a content classification system, in accordance with some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles described herein.

DETAILED DESCRIPTION

Content Classification

A social networking system may provide users with the ability to generate content and share it with friends. Users of a photo-sharing service of the social networking system may enjoy capturing images (e.g., still images, memes), video, or interactive content on their mobile phones and sharing the content with their online friends. Similarly, users may enjoy sharing content with their friends by, for example, updating interactive feeds on their homepage.

A social networking system may also provide or support the ability to indicate, identify, categorize, label, describe, or otherwise provide information about an item of content or attributes about the content. Such information can be useful in understanding and classifying the content. Such information can also be used to construct models for the purpose of classifying other content for which such information is not available. For example, known tags associated with content can be used to train a machine learning model in a supervised learning process. The machine learning model then can be used to evaluate and classify content for which no tags are available. However, while such machine learning models are effective in some situations, they often lack the ability to accurately classify variations of the content used in the supervised learning process.

FIG. 1 shows an example diagram 100 of a content classification system 102, in accordance with some embodiments. The content classification system 102 may include content recognition module(s) 104, a content recognition training module 106, a content recognition evaluation module 108, a training content datastore 110, and an evaluation content datastore 112. As described further herein, the content classification system 102 may operate to classify content, including content shared over a social networking system, without the need for supervision or manual annotation of the content.

The content recognition module(s) 104 may recognize visual attributes and/or other attributes of content. Content may include, for example, images and video. A visual attribute may include a visual pattern in an image or an image segment reflecting a characteristic property of subject matter depicted in content. Visual attributes may be based on one or a combination of, for example, appearance, color, shape, layout, etc.

In an embodiment, the content recognition module(s) 104 includes a neural network, such as a convolutional neural network. In general, a neural network can refer to a computational model used to determine, calculate, and/or approximate one or more functions that can depend on various inputs and that can be generally unknown. Neural networks can, in some cases, be represented as systems of interconnected nodes or elements, which can be referred to as "neurons". Neural networks can be configured to facilitate determining, calculating, computing, and/or approximating, etc., one or more values from one or more inputs. Neural networks can be adaptive and thus can be configured to perform machine learning and pattern recognition. In some embodiments, the neural network can correspond to a convolutional neural network. In general, a convolutional neural network can refer to a feed-forward artificial neural network in which individual neurons are tiled or configured such that the neurons respond to overlapping regions in a visual field. Convolutional neural networks can be utilized as models for image recognition and processing. The content recognition module(s) 104 may include one or more layers, such as a classification layer.

Though FIG. 1 depicts the content recognition module(s) 104 as a single module, it is noted that in various embodiments, the content classification system 102 includes a plurality of content recognition module(s) 104. More specifically, as discussed further herein, the content classification system 102 may use a first instance of the content recognition module(s) 104 (e.g., a first content recognition module) as part of an unsupervised content recognition process, and may use a second instance of the content recognition module(s) (e.g., a second content recognition module) as part of a supervised learning process. An example of an instance of the content recognition module(s) 104 is further shown in FIG. 2.

Figure 3:
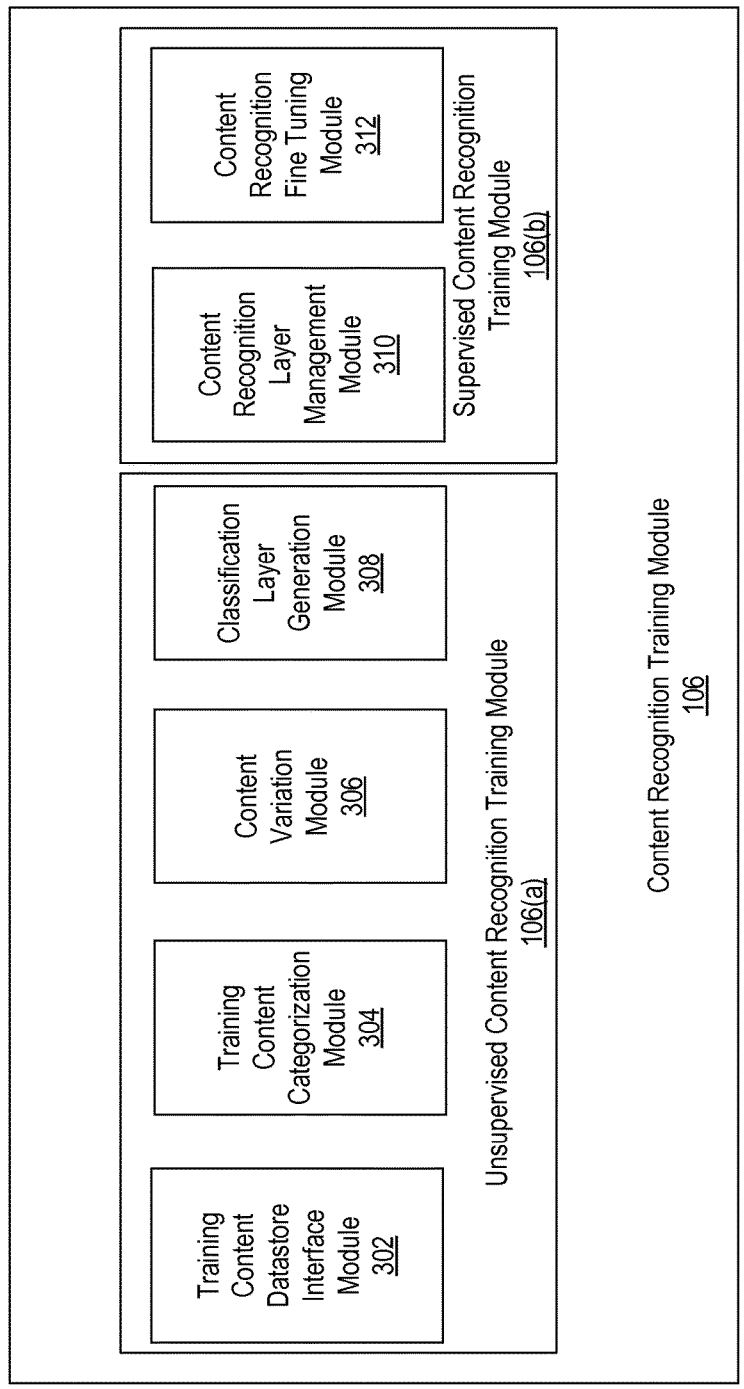
FIG. 3 shows an example diagram of a content recognition training module, in accordance with some embodiments.

The content recognition training module 106 may train the content recognition module(s) 104 to recognize visual and/or other attributes of specific types of content gathered from the training content datastore 110. In an embodiment, the content recognition training module 106 may select a plurality of content categories for training the content recognition module(s) 104 to recognize. The content recognition training module 106 may also train the content recognition module(s) 104 to recognize visual attributes of each content category with specific content items known to correspond to these content categories. The content recognition training module 106 may also fine tune the content recognition module(s) 104 to associate the recognized visual attributes of each of the plurality of categories of content with semantic sequences that are likely to be related to each of the plurality of categories of content. In some embodiments, the content recognition training module 106 generates a classification layer of a first instance of the content recognition module(s) 104, and uses this classification layer to fine-tune a second instance of the content recognition module(s) 104. The content recognition training module 106 is shown in FIG. 3.

The content recognition evaluation module 108 may execute the content recognition module(s) 104 using content gathered from the evaluation content datastore 112. More specifically, the content recognition evaluation module 108 may identify evaluation content in the evaluation content datastore 112 for classification. The content recognition evaluation module 108 may further provide the evaluation content to the content recognition module(s) 104 for the classification.

The training content datastore 110 may include content for training the content recognition module(s) 104. In some embodiments, the training content datastore 110 includes contents corresponding to known content categories. The evaluation content datastore 112 may include content for executing the content recognition module(s) 104. In various embodiments, the evaluation content datastore 112 may include content shared by users of a social networking system. For example, the evaluation content datastore 112 may include content related to posts, messages, or elements of an interactive feed in a social networking system.

Figure 2:
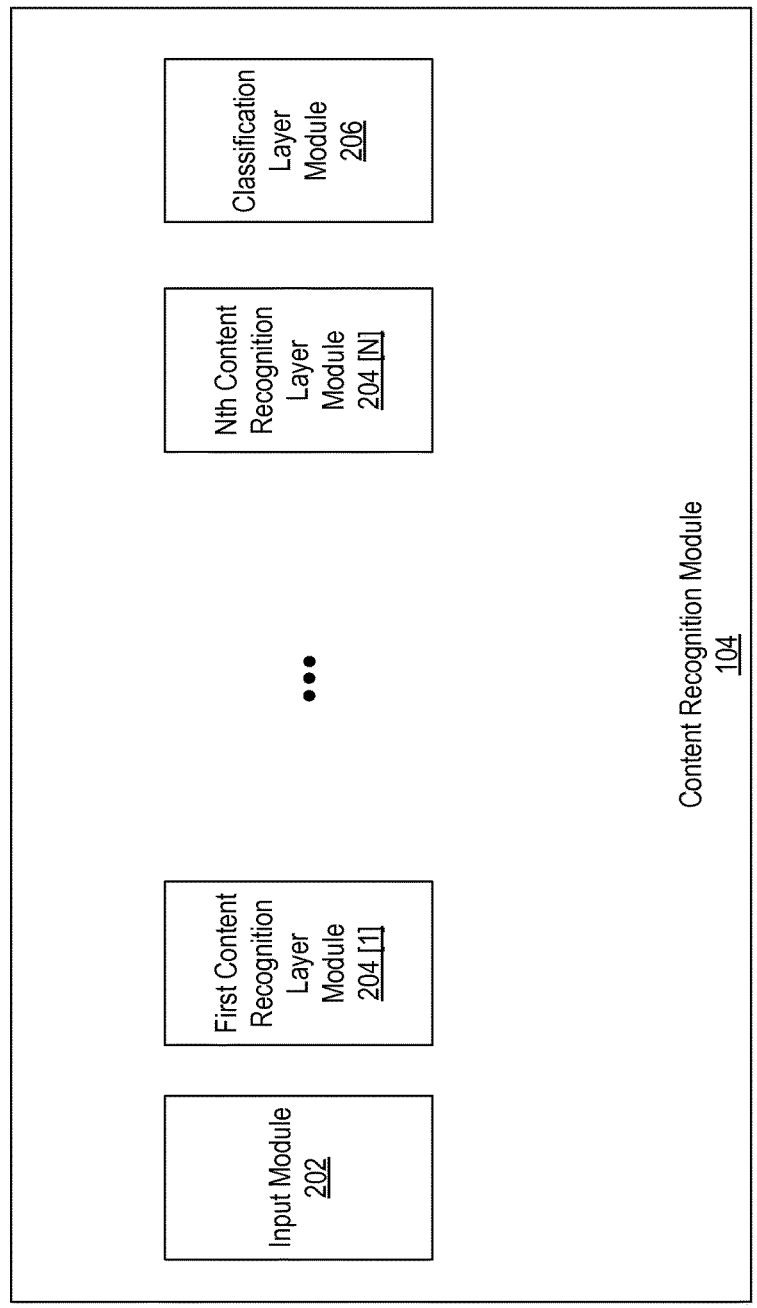
FIG. 2 shows an example diagram of a content recognition module, in accordance with some embodiments.

FIG. 2 shows an example diagram 200 of a content recognition module 104, in accordance with some embodiments. The content recognition module 104 includes an input module 202, a first content recognition layer module 204[1] through an Nth content recognition layer module 204(N), and a classification layer module 206. In some embodiments, the content recognition module 104 is implemented as a convolutional neural network. It is noted the diagram 200 shows a single instance of the content recognition module(s) 104, shown in FIG. 1. In various embodiments, the content recognition module 104 shown in the diagram 200 corresponds to a first content recognition module used as part of an unsupervised content recognition process or a second content recognition module used as part of a supervised content recognition process.

The input module 202 may receive content. For example, the input module 202 may receive training content from the training content datastore 110 or evaluation content from the evaluation content datastore 112, shown in FIG. 1. The input module 202 may further receive classification information related to how the content is to be classified by the content recognition module(s) 104. For example, the input module 202 may receive content categories (e.g., "category 1," "category 2," etc.). As another example, the input module 202 may receive semantic sequences of content. The input module 202 may provide content and/or classification information related to how the content is to be classified to the other modules of the content recognition module 104.

The first content recognition layer module 204[1] through an Nth content recognition layer module 204(N) may provide varying layers used to recognize visual properties of content. In various embodiments, the first content recognition layer module 204[1] through an Nth content recognition layer module 204(N) correspond to one or more layers of a convolutional neural network. The first content recognition layer module 204[1] through an Nth content recognition layer module 204(N) may recognize, without limitation, edges, surfaces, shapes, objects, as well as combinations of edges, surfaces, shapes, and objects The classification layer module 206 may classify the extent the content corresponds to the classification information. In various embodiments, the classification layer module 206 provides the probability that the content corresponds to the classification information.

In various embodiments, the content recognition module 104 may be trained by the content recognition training module 106 during a training phase. More specifically, the input module 202 may receive content and classification information from the content recognition training module 106. During the training phase, the content recognition module 104 may be trained to identify the extent that the content corresponds to the classification information. During an unsupervised portion of the training phase, a classification layer of the content recognition module 104 may be generated. During a supervised portion of the training phase, the generated classification layer may be used as part of fine-tuning of the content recognition module 104. Once trained, one or more of the modules of the content recognition module 104 may be configured by the content recognition evaluation module 108 to classify content in the evaluation content datastore 112 as discussed herein.

FIG. 3 shows an example diagram 300 of a content recognition training module 106, in accordance with some embodiments. The content recognition training module 106 includes an unsupervised content recognition training module 106(a) and a supervised content recognition training module 106(b). The unsupervised content recognition training module 106(a) includes a training content datastore interface module 302, a training content categorization module 304, a content variation module 306, and a classification layer selection module 308. The supervised content recognition training module 106(b) includes a content recognition layer management module 310 and a content recognition fine tuning module 312.

The training content datastore interface module 302 may interface with the training content datastore 110. In some embodiments, the training content datastore interface module 302 gathers training content and provides the training content to one or more of the other modules of the content recognition training module 106. In various embodiments, the training content datastore interface module 302 gathers training content as part of an unsupervised content recognition process.

The training content categorization module 304 may assign categories for training content. Each of the plurality of content categories may correspond to content known to have different visual properties. Examples of content categories include categories corresponding various animals (cats, dog, horses), various vehicles (cars, planes, trains, ships, etc.), various scenes (beaches, ski slopes, mountains, streams, deserts, etc.), and various structures (buildings, airports, wharves, etc.). Many other content categories are used. The names of content categories may be arbitrary in some embodiments. For example, training content categorization module 304 may assign numbers ("category 1," "category 2," etc.) and/or other symbols to various content categories. In an embodiment, the training content categorization module 304 assigns categories for training content as part of an unsupervised content recognition process.

The content variation module 306 may vary (transform or perturb) training content so that the content recognition module(s) 104 is trained to recognize variations (transformations or perturbations) invariances in content. In some embodiments, the content variation module 306 may provide variations of specific content items, with each of the variations having properties slightly different from one another. For example, the content variation module 306 may translate the specific content items, rotate the specific content items, rescale the specific content items, apply other geometric modifications of the specific content items, change colors of the specific content items, apply one or more filters to the specific content items, etc. In some embodiments, the content items include video, and the content variation module 306 detects or infers variations of objects in the specific content items based on varying perspectives, lighting, motion, and other ways the specific objects are represented in various frames of the content items. For instance, if the specific content items comprise a video, the content variation module 306 may identify variations based on different perspectives, lightings, or motions of an object in different frames of the video. In some embodiments, the content variation module 306 varies training content as part of an unsupervised content recognition process.

The classification layer selection module 308 may select a classification layer in an instance of the content recognition module(s) 104. In a specific embodiment, the classification layer selection module 308 selects a classification layer that results from training an instance of the content recognition module(s) 104 in an unsupervised content recognition process. The classification layer may classify content irrespective of the variances (transformations or perturbations) in the content.

The content recognition layer management module 310 may manage one or more layers of an instance of the content recognition module(s) 104. In an embodiment, the content recognition layer management module 310 removes a classification layer of a first content recognition module. The content recognition layer management module 310 may also provide the classification layer that was removed to a second content recognition module for fine-tuning, as discussed further herein. In various embodiments, the content recognition layer management module 310 operates as part of a supervised content recognition process. More specifically, in an embodiment, the content recognition layer management module 310 removes a classification layer from a first content recognition module (e.g., a first instance of the content recognition module(s) 104). The first content recognition module may have been trained to recognize invariances in content as part of an unsupervised content recognition process, as discussed further herein. The content recognition layer management module 310 may further provide the classification layer from the first content recognition module to a second content recognition module (e.g., a second instance of the content recognition module(s) 104). The second content recognition module may be used as part of a supervised fine-tuning process, as will be discussed further herein.

The content recognition fine tuning module 312 may fine tune an instance of the content recognition module(s) 104 to recognize content. In some embodiments, the content recognition fine tuning module 312 obtains a classification layer from a first content recognition module that was trained as part of an unsupervised content recognition process. For example, the content recognition fine tuning module 312 may obtain from the content recognition layer management module 310 a classification layer corresponding to a first content recognition module that was trained to recognize invariances in a set of training content as part of an unsupervised content recognition process. The classification layer may have been removed from the first content recognition module. The content recognition fine tuning module 312 may provide the classification layer to a second content recognition module that is used as part of a supervised content recognition process. In an embodiment, the content recognition fine tuning module 312 replaces a classification layer of the second content recognition module with the classification layer that was removed from the first content recognition module. The content recognition fine tuning module 312 may also perform backpropagation by updating one or more layers of the second content recognition module based on the classification layer that was removed from the first content recognition module. In some embodiments, updating the layers of the second content recognition module may involve fine-tuning these layers based on the classification layer that was removed from the first content recognition module. The content recognition fine tuning module 312 may perform fine-tuning as part of a supervised content recognition process.

Figure 4:
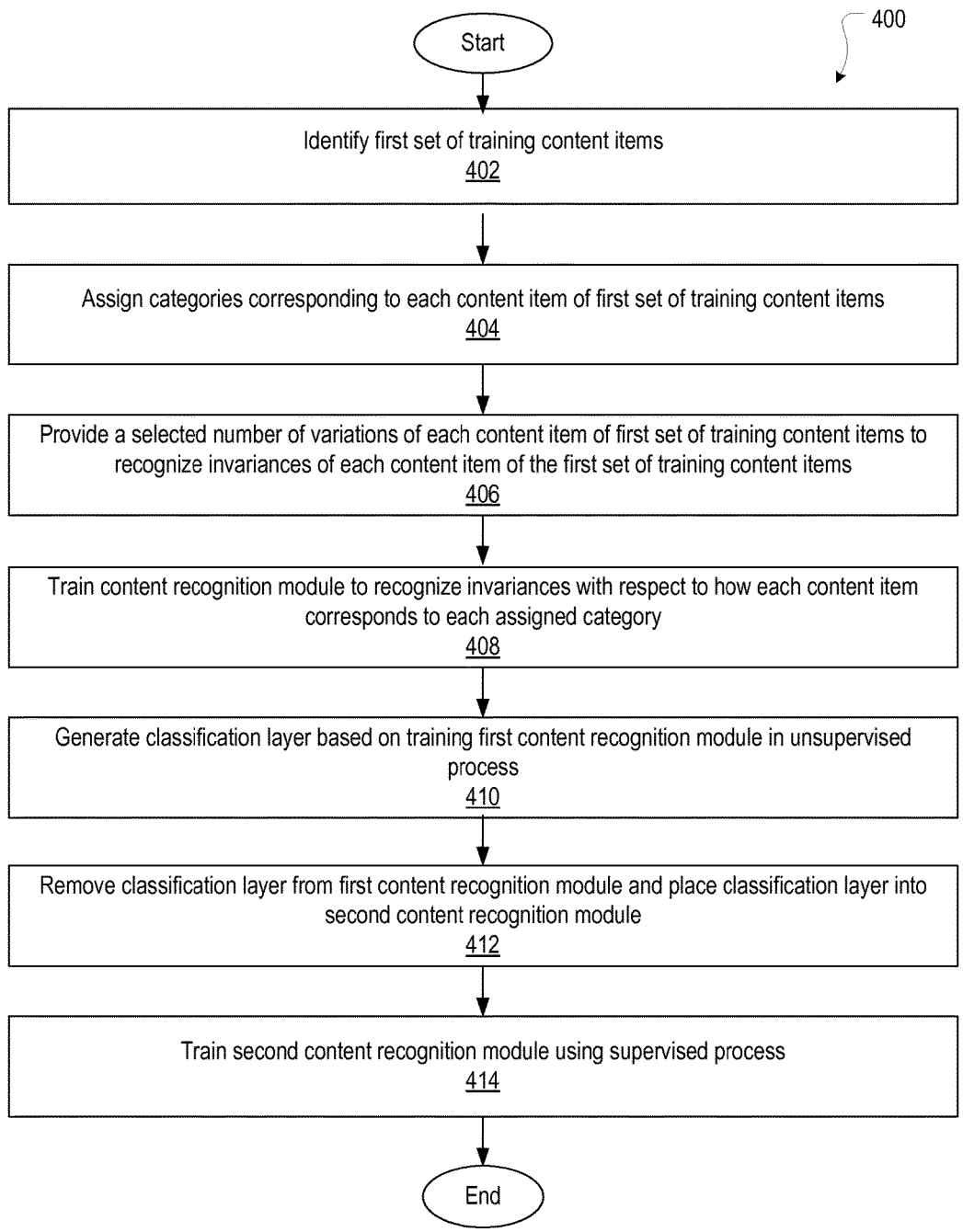
FIG. 4 shows an example diagram of a process for training a content recognition module to recognize content, in accordance with some embodiments.

FIG. 4 shows an example diagram 400 of a process for training the content recognition module(s) 104 to recognize content, in accordance with some embodiments. The process may be implemented using one or more of the modules of the content recognition training module 106, shown in FIG. 1 and FIG. 3 and discussed further herein.

At step 402, a first set of training content items is identified. In some embodiments, the training content datastore interface module 302 identifies training content for training the content recognition module(s) 104. The training content may include content known to have different visual properties, such as categories corresponding to known animals, categories corresponding to known vehicles, categories corresponding to known scenes, and categories corresponding to known structures. As an example, the training content datastore interface module 302 may gather a first content item known to depict a dog, and a second content item known to depict a cat. The training content may include image content and video content.

At step 404, categories corresponding to each content item of the first set of training content items are assigned. More specifically, the training content categorization module 304 may assign categories corresponding to each item of training content. In some embodiments, the categories include any known or convenient format. For example, the categories may include numbers (e.g., "category 1," "category 2," etc.). The categories may also include symbols or other references. To continue the foregoing example, the training content categorization module 304 may assign arbitrary categories to the gathered content items (e.g., "category 1" for dogs, "category 2" for cats, etc.).

At step 406, a selected number of variations (transformations or perturbations) of each content item of the first set of training content items is provided to recognize invariances of each content item of the first set of training content items. More specifically, the content variation module 306 may transform training content so that the content recognition module(s) 104 is trained to recognize invariances in content. In some embodiments, the content variation module 306 may translate the specific content items, rotate the specific content items, rescale the specific content items, apply other geometric modifications of the specific content items, change colors of the specific content items, and/or apply one or more filters to the specific content items. The content variation module 306 may also identify or infer variations of objects in the specific content items based on varying perspectives, lighting, motion, and other ways the specific objects are represented in various frames of the content items. In some embodiments, the content variation module 306 provides geometric variations and identifies variations based on the ways specific objects are represented in various frames of video. To continue the foregoing example, the content variation module 306 may produce variations of the content associated with the dog, and may produce variations of the content associated with the cat.

At step 408, a first instance of the content recognition module(s) 104 is trained to recognize the invariances with respect to how each content item of the first set of training content items corresponds to each assigned category in an unsupervised content recognition process. In a specific embodiment, the content variation module 306 may provide the transformed content items and the assigned categories to the first instance of the content recognition module(s) 104. The content recognition layer management module 310 may then also instruct the first instance of the content recognition module(s) 104 to associate each assigned category with respective content items. To further continue the foregoing example, the content variation module 306 may provide variations of the first content item and variations of the second content item to the first instance of the content recognition module(s) 104. Further, the content recognition layer management module 310 may train the first instance of the content recognition module(s) 104 to associate the transformed representations of the first content item with the category "category 1," and may train the first instance of the content recognition module(s) 104 to associate the perturbed representations of the second content item with the category "category 2."

At step 410, a classification layer is generated based on the training the first content recognition module in the unsupervised process. In an embodiment, the classification layer selection module 308 selects a classification layer in the first instance of the content recognition module(s) 104. The classification layer can classify content items categories irrespective of invariances of content items corresponding to those content item categories.

At step 412, the classification layer is removed from the first content recognition module and incorporated into a second content recognition module for fine tuning the second content recognition module. In an embodiment, the content recognition layer management module 310 removes the classification layer from the first instance of the content recognition module(s) 104 and places this classification layer into a second instance of the content recognition module(s) 104.

At step 414, the second content recognition module is trained using a supervised process. In some embodiments, the content recognition fine tuning module 312 trains the second instance of the content recognition module(s) 104 to recognize attributes of content using the classification layer that was generated as part of the first instance of the content recognition module(s) 104 during the unsupervised content recognition process. More specifically, the content recognition fine tuning module 312 may perform backpropagation of one or more layers of the second instance of the content recognition module(s) 104 based on the classification layer generated as part of the first instance of the content recognition module(s) 104 during the unsupervised content recognition process. This may be performed as part of a supervised content recognition process. Such backpropagation may result in fine tuning the second instance of the content recognition module(s) 104.

Figure 5:
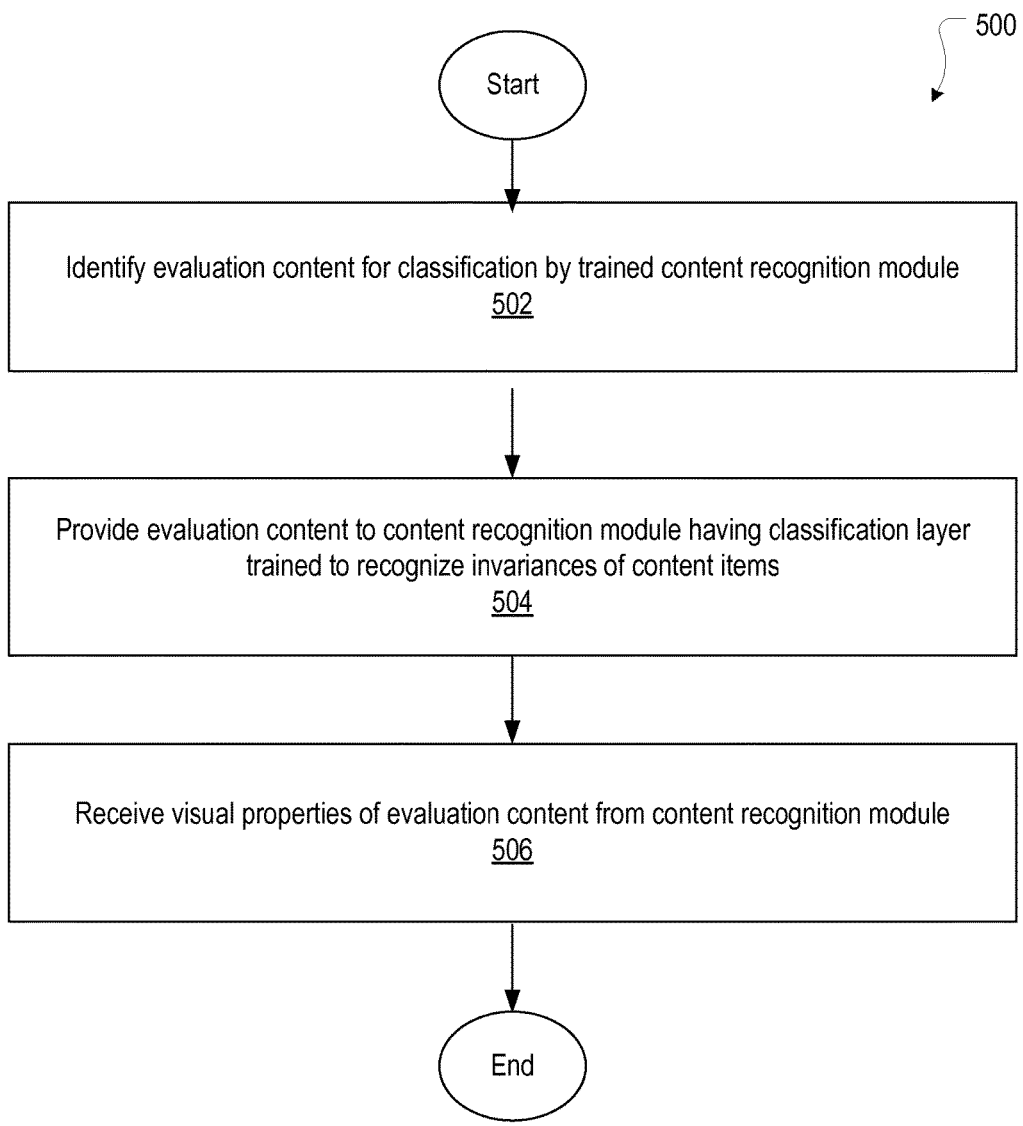
FIG. 5 shows an example diagram of a process for using a trained content recognition module to recognize evaluation content, in accordance with some embodiments.

FIG. 5 shows an example diagram 500 of a process for using a trained content recognition module to recognize evaluation content, in accordance with some embodiments. The process may be implemented using one or more of the modules of the content recognition evaluation module 108, shown in FIG. 1 and discussed further herein. At step 502, evaluation content is identified for classification by a trained content recognition module. In a specific embodiment, the content recognition evaluation module 108 identifies evaluation content for classification by the content recognition module(s) 104, which has been trained to recognize visual properties of content items by the content recognition training module 106. At step 504, the evaluation content is provided to the content recognition module, which has a classification layer trained to recognize invariances of evaluation content. In various embodiments, the content recognition evaluation module 108 performs step 504 by providing the evaluation content to the content recognition module(s) 104. At step 506, visual properties of the evaluation content are received from the content recognition module(s) 104. The content recognition evaluation module 108 may receive these visual properties from the content recognition module(s) 104.

Social Networking System—Example Implementation

Figure 6:
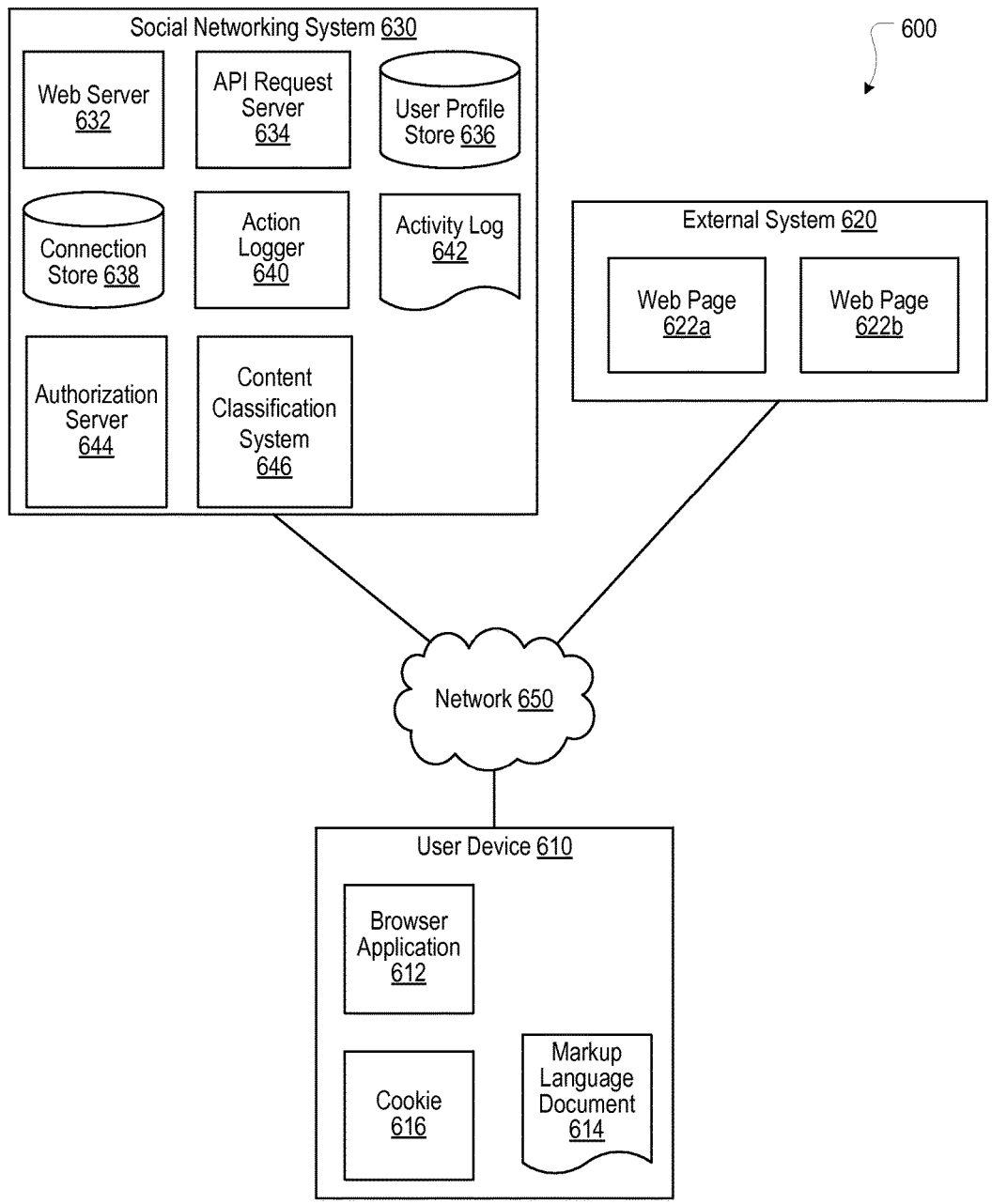
FIG. 6 shows an example diagram of a network diagram of an unsupervised content classification environment, in accordance with some embodiments.

FIG. 6 is a network diagram of an example social networking environment 600 in which to implement the elements of the content classification system 102, in accordance with some embodiments. The social networking environment 600 includes one or more user devices 610, one or more external systems 620, a social networking system 630, and a network 650. In an embodiment, the social networking system discussed in connection with the embodiments described above may be implemented as the social networking system 630. For purposes of illustration, the embodiment of the social networking environment 600, shown by FIG. 6, includes a single external system 620 and a single user device 610. However, in other embodiments, the social networking environment 600 may include more user devices 610 and/or one or more external systems 620. In certain embodiments, the social networking system 630 is operated by a social networking system provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). In various embodiments, the network 650 may be implemented as the network 650.

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614. In an embodiment, the user device 610 may include a client application module 618. The client application module 618 may be implemented as the client application module 114.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. The external system may also include content module(s) 624, as described in more detail herein. In various embodiments, the content module(s) 624 may be implemented as the content module(s) 102.

The social networking system 630 includes one or more computing devices for a social networking system, including a plurality of users, and providing users of the social networking system with the ability to communicate and interact with other users of the social networking system. In some instances, the social networking system can be represented by a graph, i.e., a data structure including edges and nodes. Other data structures can also be used to represent the social networking system, including but not limited to databases, objects, classes, Meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, an authorization server 644, a content classification system 646, and content system(s) 648. In an embodiment, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 420. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

The social networking system 630 may include the content classification system 646. In an embodiment, the content classification system 646 may be implemented as the content classification system 102, shown in FIG. 1 and discussed further herein.

Hardware Implementation

Figure 7:
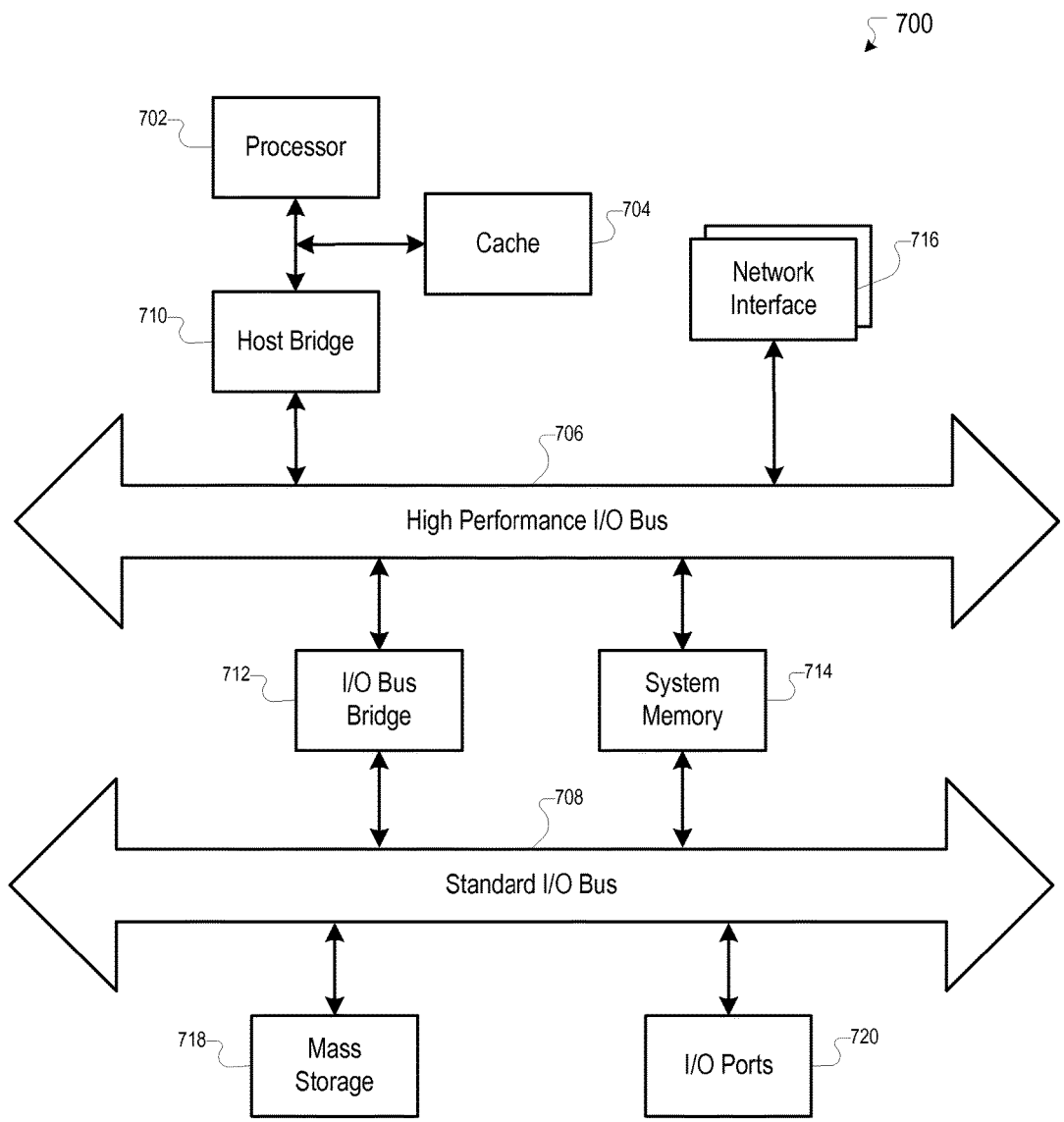
FIG. 7 shows an example diagram of a computer system that may be used to implement one or more of the embodiments described herein in accordance with some embodiments.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment, the computer system 700 may reside with the social networking system 630, the device 610, and the external system 620, or a component thereof. In an embodiment, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and a network interface 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed:

1. A computer implemented method comprising:
   identifying, by a computing system, a set of training content items, each of the set of training content items comprising video content;
   assigning, by the computing system, a category to each of the set of training content items;
   providing, by the computing system, a plurality of variations of the each of the set of training content items;
   training, by the computing system, a first instance of a content recognition module comprising a first convolutional neural network in an unsupervised process to associate the plurality of variations of the each of the set of training content items with the category assigned to the each of the set of training content items;
   generating, by the computing system, a classification layer of the first instance of the content recognition module from the training the first instance of the content recognition module in the unsupervised process, wherein the classification layer is trained to recognize invariances in the each of the set of training content items and the plurality of variations of the each of the set of training content items;
   replacing, by the computing system, a classification layer of a second instance of the content recognition module comprising a second convolutional neural network with the classification layer of the first instance of the content recognition module to provide the second instance of the content recognition module with a new classification layer; and
   training, by the computing system, the second instance of the content recognition module in a supervised process based on the new classification layer, wherein the training the second instance of the content recognition module includes updating one or more layers of the second convolutional neural network by performing a backpropagation based on the new classification layer.

2. The method of claim 1, wherein the plurality of variations comprises a variation of an object in the video content.

3. The method of claim 1, wherein the training the second instance of the content recognition module in the supervised process comprises associating the each of the set of training content items with a semantic sequence corresponding to the category assigned to the each of the set of training content items.

4. The method of claim 1, wherein the plurality of variations comprises at least one geometric variation of the each of the set of training content items.

5. The method of claim 1, wherein the plurality of variations comprises at least one of a rotation, a translation, a rescaling, a color change, a geometric modification, or a filtering of the each of the set of training content items.

6. The method of claim 1, wherein the plurality of variations comprises a variation of a perspective, lighting, or motion of an object.

7. The method of claim 1, further comprising using the second instance of the content recognition module to classify a set of evaluation content items.

8. The method of claim 7, wherein the set of evaluation content items includes content items uploaded by users of a social networking system.

9. A system comprising:
   at least one processor;
   a memory storing instructions configured to instruct the at least one processor to perform:
   identifying, by a computing system, a set of training content items, each of the set of training content items comprising video content;
   assigning, by the computing system, a category to each of the set of training content items;
   providing, by the computing system, a plurality of variations of the each of the set of training content items;
   training, by the computing system, a first instance of a content recognition module comprising a first convolutional neural network in an unsupervised process to associate the plurality of variations of the each of the set of training content items with the category assigned to the each of the set of training content items;
   generating, by the computing system, a classification layer of the first instance of the content recognition module from the training the first instance of the content recognition module in the unsupervised process, wherein the classification layer is trained to recognize invariances in the each of the set of training content items and the plurality of variations of the each of the set of training content items;
   replacing, by the computing system, a classification layer of a second instance of the content recognition module comprising a second convolutional neural network with the classification layer of the first instance of the content recognition module to provide the second instance of the content recognition module with a new classification layer; and
   training, by the computing system, the second instance of the content recognition module in a supervised process based on the new classification layer, wherein the training the instance of the content recognition module includes updating one or more layers of the second convolutional neural network by performing a backpropagation based on the new classification layer.

10. The system of claim 9, wherein the plurality of variations comprises a variation of an object in the video content.

11. The system of claim 9, wherein the training the second convolutional neural network in the supervised process comprises associating each of the set of training content items with a semantic sequence corresponding to the category assigned to the each of the set of training content items.

12. The system of claim 9, wherein the plurality of variations comprises a variation of a perspective, lighting, or motion of an object.

13. The system of claim 9, wherein the instructions are configured to instruct the at least one processor to further perform:
using the second instance of the content recognition module to classify a set of evaluation content items.

14. The system of claim 13, wherein the set of evaluation content items includes content items uploaded by users of a social networking system.

15. A non-transitory computer storage medium storing computer-executable instructions that, when executed, cause a computer system to perform a computer-implemented method comprising:
identifying, by a computing system, a set of training content items, each of the set of training content items comprising video content;
assigning, by the computing system, a category to each of the set of training content items;
providing, by the computing system, a plurality of variations of the each of the set of training content items;
training, by the computing system, a first instance of a content recognition module comprising a first convolutional neural network in an unsupervised process to associate the plurality of variations of the each of the set of training content items with the category assigned to the each of the set of training content items;
generating, by the computing system, a classification layer of the first instance of the content recognition module from the training the first instance of the content recognition module in the unsupervised process, wherein the classification layer is trained to recognize invariances in the each of the set of training content items and the plurality of variations of the each of the set of training content items;
replacing, by the computing system, a classification layer of a second instance of the content recognition module comprising a second convolutional neural network with the classification layer of the first instance of the content recognition module to provide the second instance of the content recognition module with a new classification layer; and
training, by the computing system, the second instance of the content recognition module in a supervised process based on the new classification layer, wherein the training the second instance of the content recognition module includes updating one or more layers of the second convolutional neural network by performing a backpropagation based on the new classification layer.

16. The computer storage medium of claim 15, wherein the plurality of variations comprises a variation of an object in the video content.

17. The computer storage medium of claim 15, wherein the training the second instance of the content recognition module in the supervised process comprises associating each of the set of training content items with a semantic sequence corresponding to the category assigned to the each of the set of training content items.

18. The computer storage medium of claim 15, wherein the plurality of variations comprises a variation of a perspective, lighting, or motion of an object.

19. The computer storage medium of claim 15, wherein the instructions, when executed, cause the computer system to perform the method further comprising:
using the second instance of the content recognition module to classify a set of evaluation content items.

20. The computer storage medium of claim 19, wherein the set of evaluation content items includes content items uploaded by users of a social networking system.

* * * * *